US006785203B2

(12) United States Patent
Maruyama et al.

(10) Patent No.: US 6,785,203 B2
(45) Date of Patent: Aug. 31, 2004

(54) OPTICAL LENS FOR OPTICAL DISC DRIVE WITH ABERRATION SUPPRESSION FOR RECORDING/REPRODUCING FOR A PLURALITY OF OPTICAL DISC TYPES

(75) Inventors: Koichi Maruyama, Tokyo (JP); Takeshi Shimano, Saitama-ken (JP); Shigeru Nakamura, Tokyo (JP); Akira Arimoto, Tokyo (JP); Kazuo Shigematsu, Saitma-ken (JP)

(73) Assignees: PENTAX Corporation, Tokyo (JP); Hitachi, Ltd., Tokyo (JP)

(*) Notice: Subject to any disclaimer, the term of this patent is extended or adjusted under 35 U.S.C. 154(b) by 159 days.

(21) Appl. No.: 09/793,544

(22) Filed: Feb. 27, 2001

(65) Prior Publication Data

US 2001/0028626 A1 Oct. 11, 2001

(30) Foreign Application Priority Data

Feb. 29, 2000 (JP) ........................................ 2000-054907

(51) Int. Cl.[7] ................................................ G11B 7/09
(52) U.S. Cl. ................................ 369/44.23; 369/44.34; 369/44.37; 369/112.23
(58) Field of Search ........................ 369/44.37, 44.34, 369/44.23, 112.23, 44.41

(56) References Cited

U.S. PATENT DOCUMENTS

| | | | | |
|---|---|---|---|---|
| 4,657,351 A | * | 4/1987 | Mori | .......................... 359/687 |
| 4,942,584 A | * | 7/1990 | Karaki et al. | ................... 372/9 |
| 4,964,703 A | * | 10/1990 | Suda et al. | ................. 350/413 |
| 5,195,070 A | * | 3/1993 | Shiba et al. | .............. 369/44.12 |
| 5,198,931 A | * | 3/1993 | Igarashi | ....................... 359/660 |
| 5,448,536 A | * | 9/1995 | Muranishi et al. | ........ 369/13.28 |
| 5,671,209 A | * | 9/1997 | Kamioka et al. | ......... 369/44.37 |
| 6,084,843 A | | 7/2000 | Abe et al. | |
| 6,088,322 A | | 7/2000 | Broome et al. | |
| 6,118,594 A | | 9/2000 | Maruyama | |
| 6,191,889 B1 | | 2/2001 | Maruyama | |
| 6,313,956 B1 | * | 11/2001 | Saito | .......................... 359/721 |
| 6,353,583 B1 | * | 3/2002 | Kudoh et al. | ............. 369/44.41 |
| 6,545,958 B1 | * | 4/2003 | Hirai et al. | ............... 369/44.32 |

FOREIGN PATENT DOCUMENTS

| | | |
|---|---|---|
| JP | 8-281819 | 10/1996 |
| JP | 10261240 | 9/1998 |
| JP | 10261241 | 9/1998 |
| JP | 11149657 | 6/1999 |

OTHER PUBLICATIONS

English Language Abstract of JP 10–261241.

* cited by examiner

*Primary Examiner*—Gautam R. Patel
(74) *Attorney, Agent, or Firm*—Greenblum & Bernstein, P.L.C.

(57) ABSTRACT

An objective lens converges a shorter wavelength laser beam on a DVD having a protective layer, which is 0.6 mm thick, and a longer wavelength laser beam on a CD having a protective layer, which is 1.2 mm thick. A common region is defined on the objective lens. The common region provides a numerical aperture appropriate for converging the longer wavelength laser beam on the CD. Coma of the objective lens in the first region is compensated better in a case where the longer wavelength laser beam is converged on the CD than a case where the shorter wavelength laser beam is converged on the DVD.

14 Claims, 12 Drawing Sheets

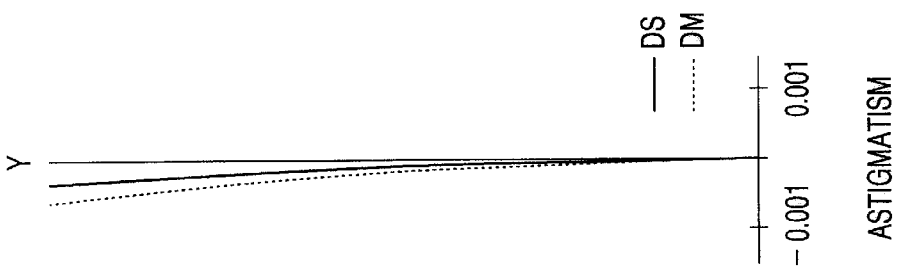
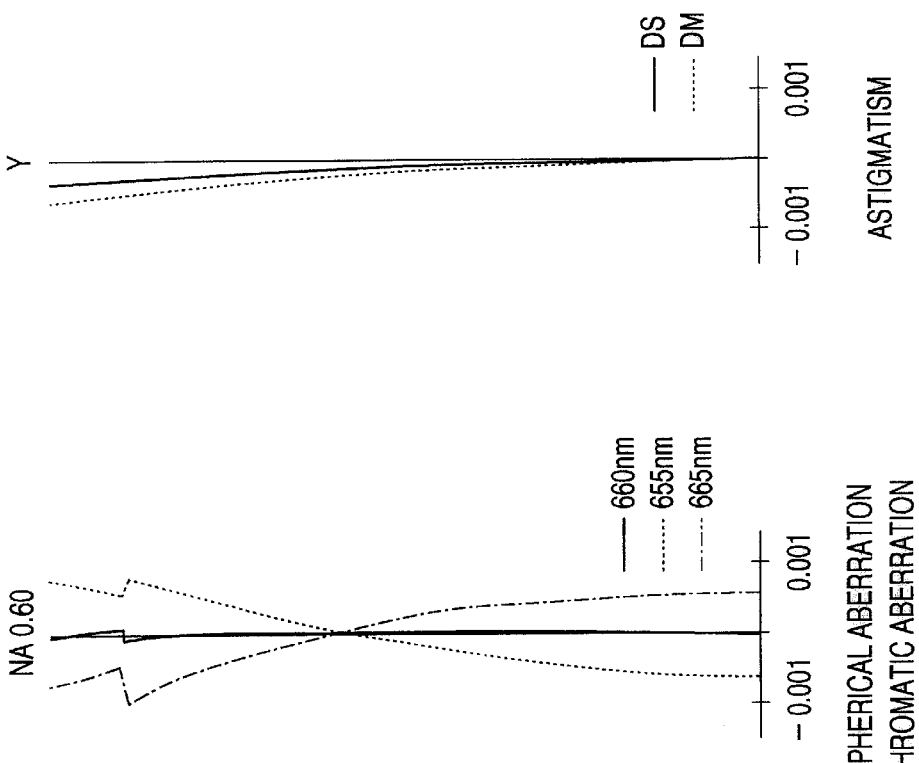
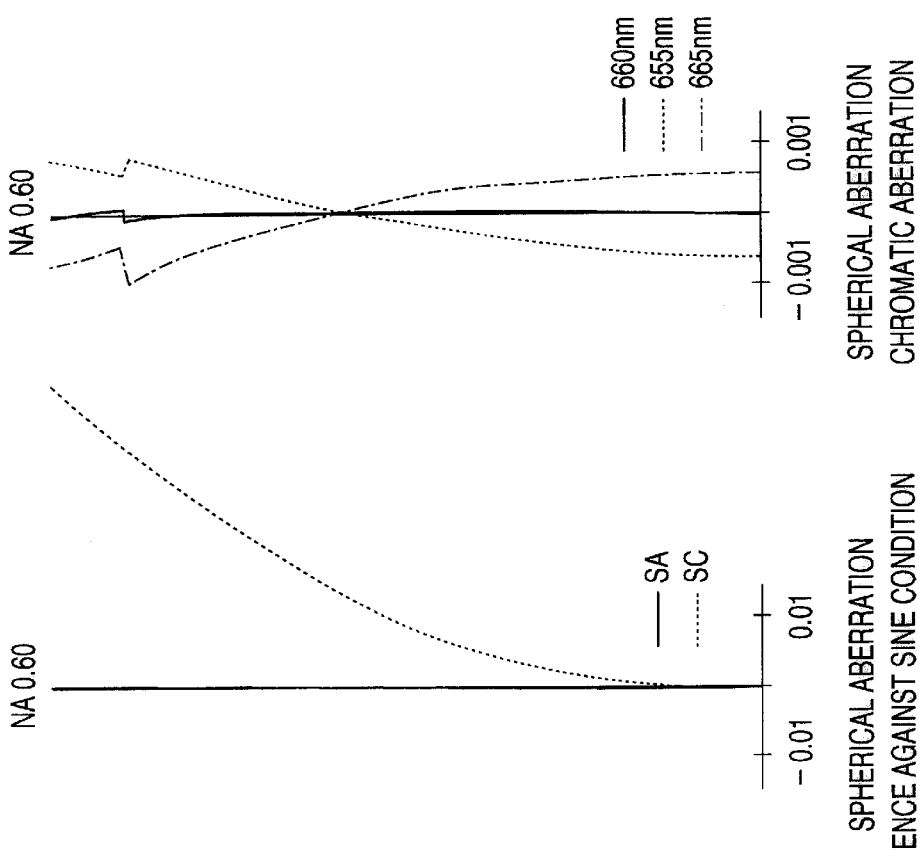

Y= -0.020
Z= 0.000
DS= 0.000
DM= 0.000

Y= -0.031
Z= 0.000
DS= 0.000
DM= 0.000

Y= -0.041
Z= 0.000
DS= 0.000
DM= 0.001

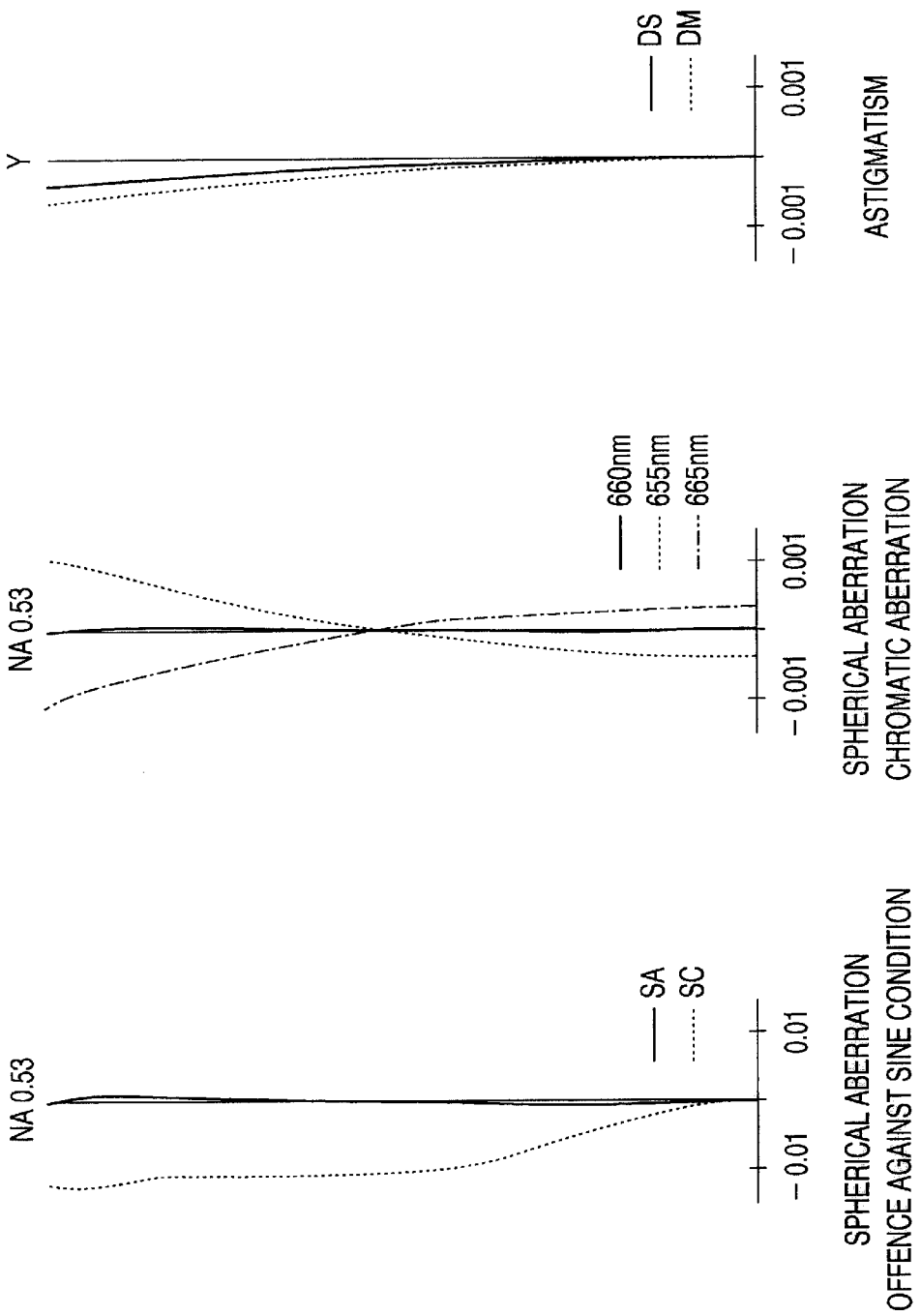

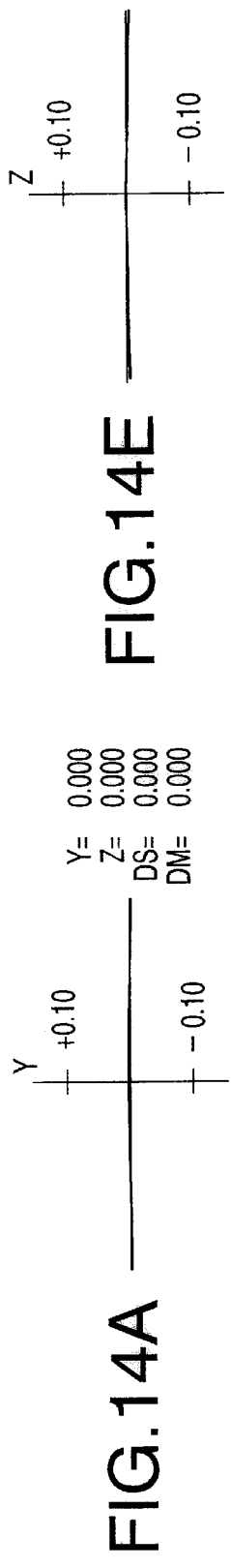
FIG.14A
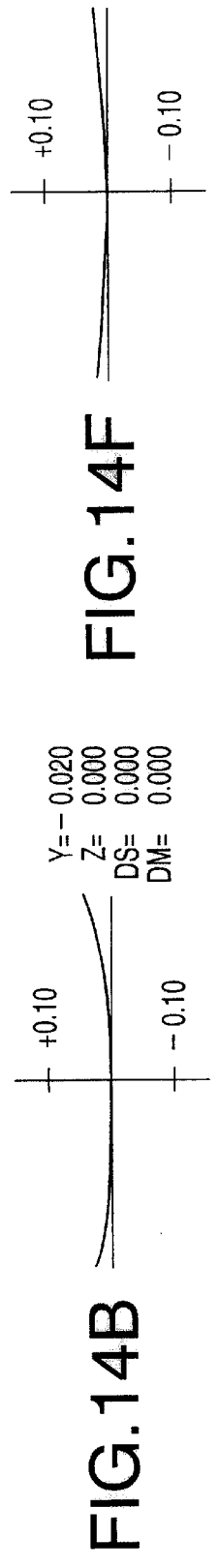
FIG.14B
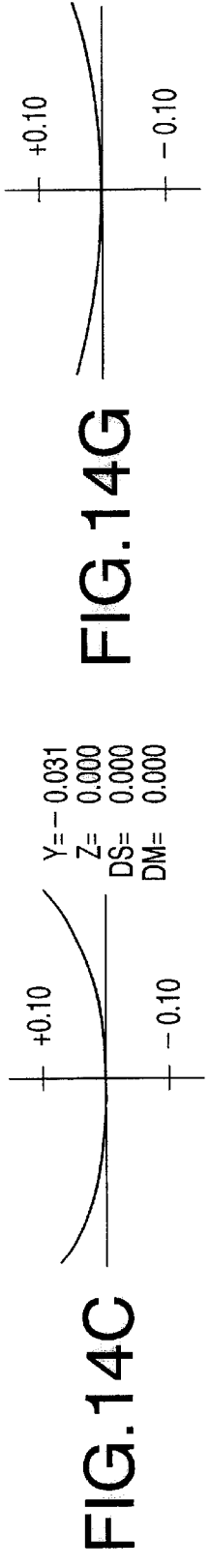
FIG.14C
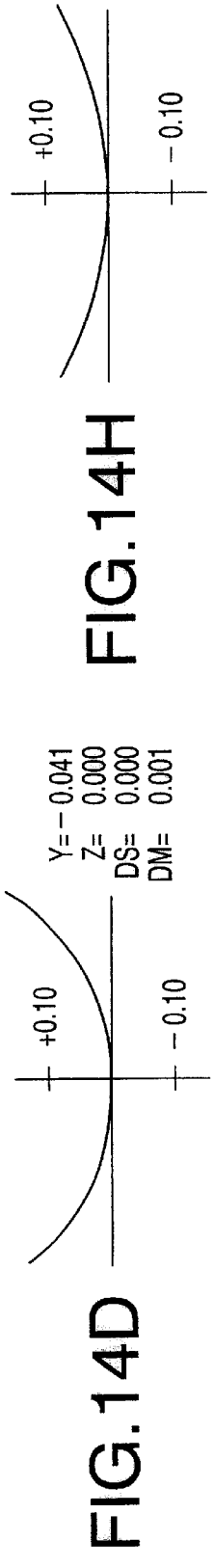
FIG.14D
FIG.14E
FIG.14F
FIG.14G
FIG.14H

OPTICAL LENS FOR OPTICAL DISC DRIVE WITH ABERRATION SUPPRESSION FOR RECORDING/REPRODUCING FOR A PLURALITY OF OPTICAL DISC TYPES

BACKGROUND OF THE INVENTION

The present invention relates to an optical disc drive capable of recording and/or reproducing data to/from various types of optical discs having different characteristics, such as a thickness of a protective layer and a data recording density. The present invention also relates to an objective Lens and an optical head to be employed in the above-described optical disc drive.

There are plurality of standards regarding the characteristics of the optical discs, including the thickness of the protective layer which covers a data recording surface of the optical disc and/or the data recording density. For example, the thickness of the protective layer of a CD (Compact Disc) or a CD-R (CD recordable) whose recording density is relatively low is 1.2 mm, while that of a DVD (Digital Versatile Disc) whose recording density is relatively high is 0.60 mm.

For recording and/or reproducing data to/from the DVD, since it has a relatively high data recording density, in order to make the size of a beam spot sufficiently small, a laser beam whose wavelength is in a range of approximately 635–660 nm is to be used. For the CD-R, in view of its reflection characteristics, a laser beam whose wavelength is approximately 780 nm is to be used.

The above-described optical discs may preferably be used in a single optical disc drive. In order to allow a single optical disc drive to use both the DVD and the CD-R, the disc drive is required to have at least two laser sources respectively emitting the laser beams as described above.

In the meantime, in view of downsizing of the disc drive, it is preferable that the optical system adopted in an optical head for the disc drive is as compact as possible. In particular, optical elements such as an objective lens is preferably used for both laser beams, which enables the laser sources (i.e., laser diodes) to be implemented in a single package and provided as a light source module.

If the two laser diodes are incorporated in a single package, beam emitting points of the two laser diodes are aligned in a direction perpendicular to an optical axis of the objective lens. Therefore, at least one of the beam emitting points is located off the optical axis. Further, since a single optical system is used for two different wavelengths, coma cannot be compensated for both types of optical discs whose protective layers having different thickness. Therefore, in the above-described type of optical disc drive, it is relatively difficult to balance the degree of compensation of coma and arrangement of the beam emitting points.

SUMMARY OF THE INVENTION

It is therefore an object of the invention to provide an improved optical disc drive that utilizes a light source module including at least two laser diodes emitting laser beams having different wavelengths, and a single objective optical system for both wavelengths. In the improved optical disc drive, aberration can be well suppressed with allowing recording and reproducing of data for a plurality of types of optical discs to be performed. A further object of the invention is to provide an optical head for such an optical disc drive, and an objective lens therefor.

According to an aspect of the invention, there is provided an objective lens that converges a first laser beam having a first wavelength on a first optical disc having a first protective layer, and a second laser beam having a second wavelength, which is longer than the first wavelength, on a second optical disc having a second protective layer, data recording density of the first optical disc being greater than data recording density of the second optical disc, a thickness of the first protective layer being smaller than a thickness of the second protective layer, a first region being defined on the objective lens, the first region providing a numerical aperture appropriate for converging the second laser beam on the second optical disc, coma of the objective lens in the first region being compensated better in a case where the second laser beam is converged on the second optical disc than a case where the first laser beam is converged on the first optical disc.

With this configuration, aberration can be well suppressed for both the first and second laser beams, with allowing recording and reproducing of data for a plurality of types of optical discs to be performed.

Optionally the objective lens may preferably satisfy a sine condition when the second laser beam is converged on the second optical disc.

Optionally, the objective lens may satisfy the following condition:

$$0 < |SC_2/SC_1| < 0.2,$$

where, $SC_1$ represents an offence SC against sine condition at the peripheral portion of the first region, taking the protective layer of the first optical disc into account, when the first laser beam is con-verged on the first optical disc, $SC_2$ represents an offence SC against sine condition at the peripheral portion of the first region, taking the protective layer of the second optical disc into account, when the second laser beam is converged on the second optical disc, and the offence SC against the sine condition is defined by the formula below:

$$SC = nH_1/(n' \sin U') - f(1-m)$$

where, n represents a refractive index on the beam incident side medium (i.e., the air), n' represents a refractive index on the beam emerging side medium (i.e., the protective layer), U' represents an angle of the emerging beam with respect to the optical axis, m represents a paraxial magnification, $H_1$ represents a ray height on a principal plane, and f represents a focal length.

It should be noted that, when the offence SC of the sine condition is calculated, the protective layer of the optical disc is taken into account.

Still optionally, the objective lens may consist of a single lens element, one of refraction surfaces being formed with a diffractive lens structure exhibiting spherical aberration which is changed in an undercorrected direction as the wavelength increases.

Further optionally, the diffractive lens structure includes a plurality of concentric annular zones.

In a particular case, the first wavelength is approximately 660 nm, and the second wavelength is approximately 785 nm.

According to another aspect of the invention, there is provided an optical head for an optical disc drive, which is provided with a first laser diode that emits a first laser beam having a first wavelength, a second laser diode that emits a second laser beam having a second wavelength which is longer than the first wavelength, beam emitting points of the first laser diode and the second laser diode being close to each other, an objective lens, the objective lens converging the first laser beam on a first optical disc having a first protective layer to form a beam spot, the objective lens converging the second laser beam on a second optical disc having a second protective layer to form the beam spot, data recording density of the first optical disc being greater than data recording density of the second optical disc, a thickness of the first protective layer being smaller than a thickness of the second protective layer, coma of the objective lens being compensated better in a case where the second laser beam is converged on the second optical disc than a case where the first laser beam is converged on the first optical disc, an actuator that drives the objective lens so that the beam spot traces a data track on the optical disc, a photo detecting system that receives the beam reflected by the optical disc, a beam splitting element that directs the beam reflected by the optical disc to the photo detecting system.

Optionally, the first laser diode and the second laser diode may be packaged in a single module.

Alternatively, the first laser diode, the second laser diode and the photo detecting system may be packaged in a single module.

Still optionally, a beam emitting point of the first laser diode is located closer to the optical axis of the objective lens than a beam emitting point of the second laser diode.

In a particular case, the beam emitting point of the first laser diode is located on the optical axis of the objective lens.

It should be noted that there are three possible arrangements of the beam emitting points of the laser diodes in relation to compensation for coma.

(1) The beam emitting points may be arranged such that coma is evenly compensated for both the shorter wavelength laser beam and the longer wavelength laser beam.
(2) Coma is compensated for the shorter wavelength laser beam, and the beam emitting point of the longer wavelength laser beam, for which the coma is not compensated, is located on the optical axis.
(3) Coma is compensated for the longer wavelength laser beam, and the beam emitting point of the shorter wavelength laser beam is located on the optical axis.

According to method (1), in either wave length, coma remains. According to method (2), the beam emitting point for the shorter wavelength beam is located at an off-axis position. In this case, astigmatism is relatively large and a desired or appropriate beam spot cannot be formed on the first optical disc. According to method (3), which is employed in an embodiment of the invention, the beam emitting point for the longer wavelength beam is located off the optical axis, and therefore, the objective lens exhibits astigmatism for the longer wavelength beam. Since the longer wavelength beam is utilized, the astigmatism is sufficiently small.

According to another aspect of the invention, there is provided an optical disc drive, provided with an optical head, which includes the optical head as described above, and further, a laser driver that drives the first and second laser diodes to emit the first and second laser beams, a current-to-voltage converter that converts electrical current output by the photo detecting system to a voltage signal, an operation circuit that obtains position control signal for the beam spot in accordance with the voltage signal, a controller the drives the actuator in accordance with the position control signal, a motor that rotates the optical disc, a course actuator that moves the optical head in a radial direction of the optical disc, and a signal processing circuit that reproduces data recorded on the optical disc in accordance with the voltage signal.

DESCRIPTION OF THE ACCOMPANYING DRAWINGS

Figure 5:
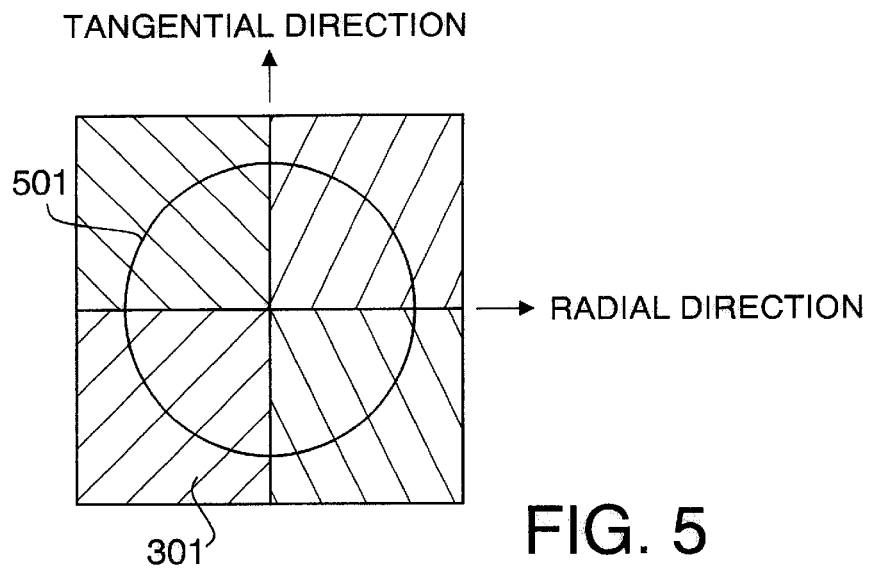
Figure 6:
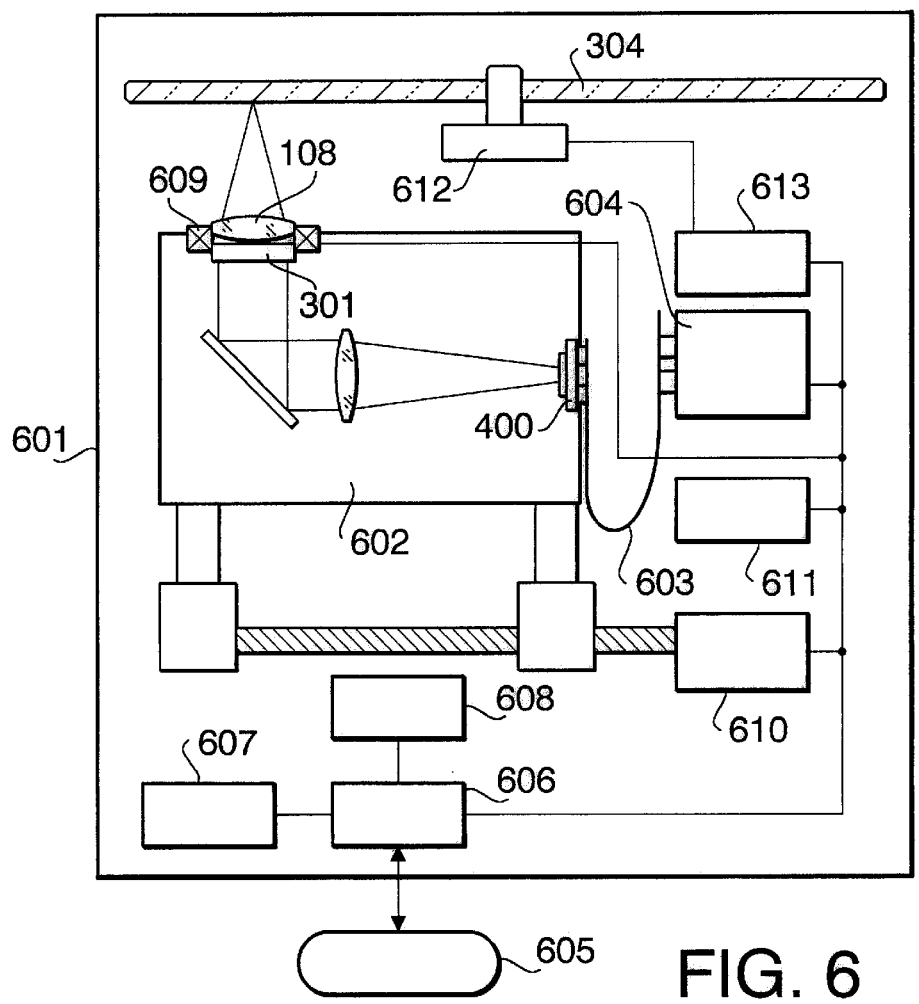
Figure 7:
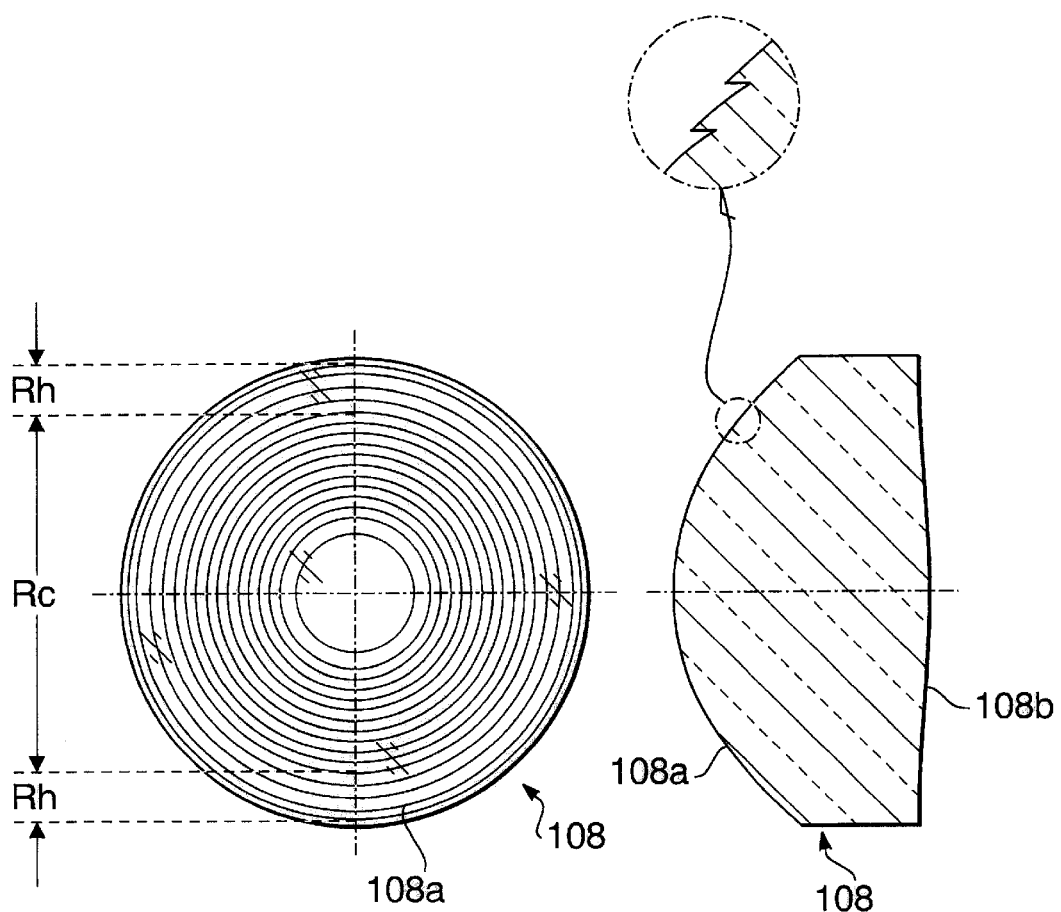
Figure 8:
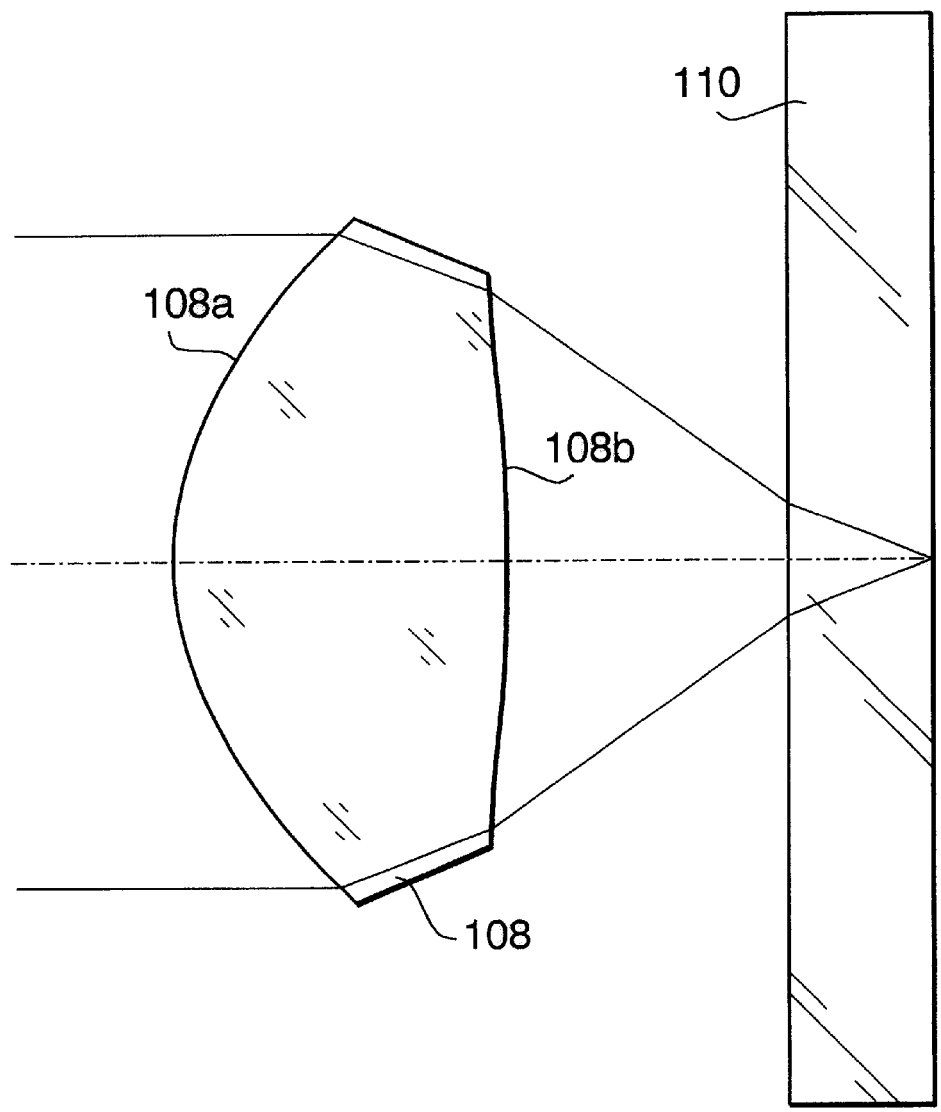
Figure 11:
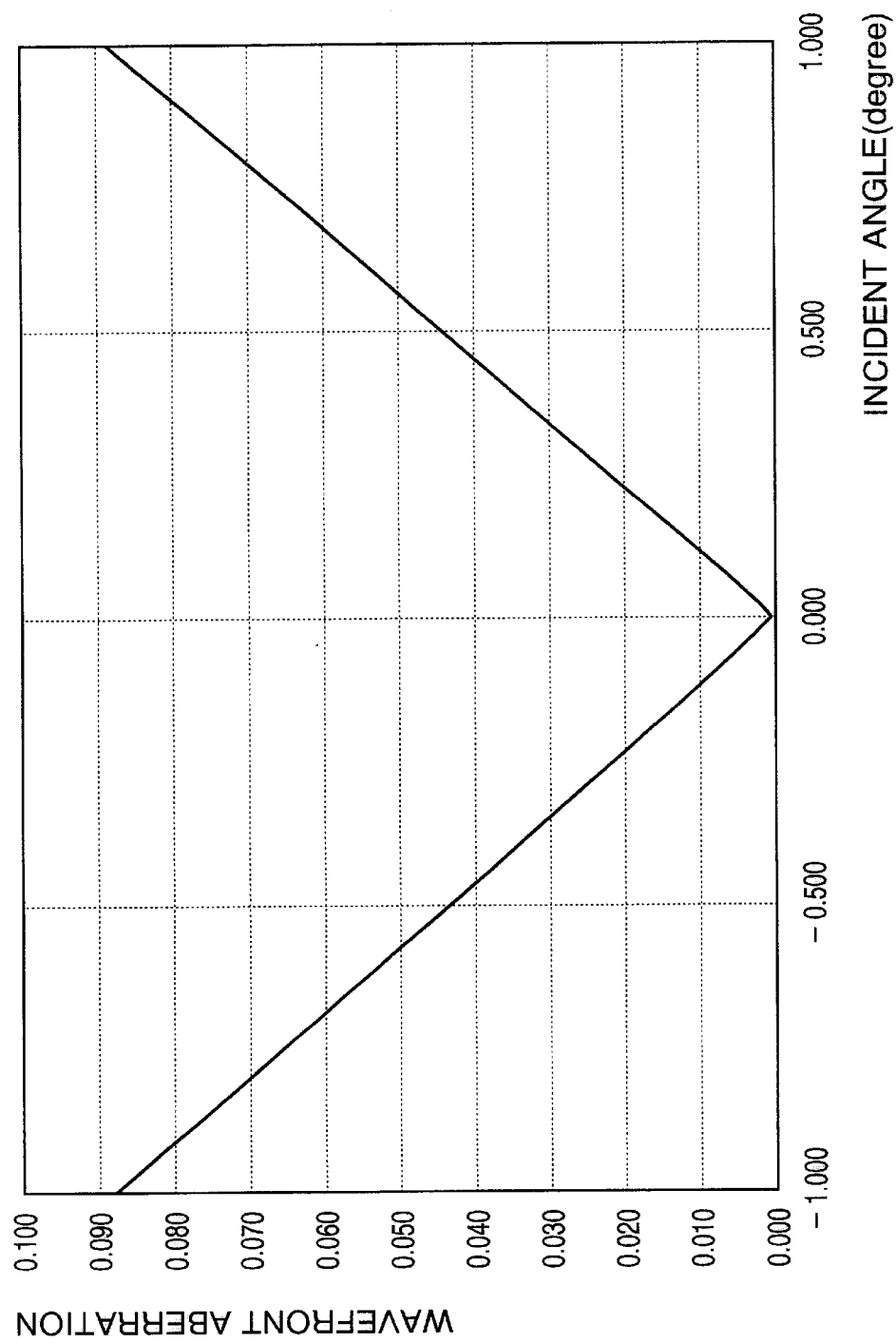
Figure 12:
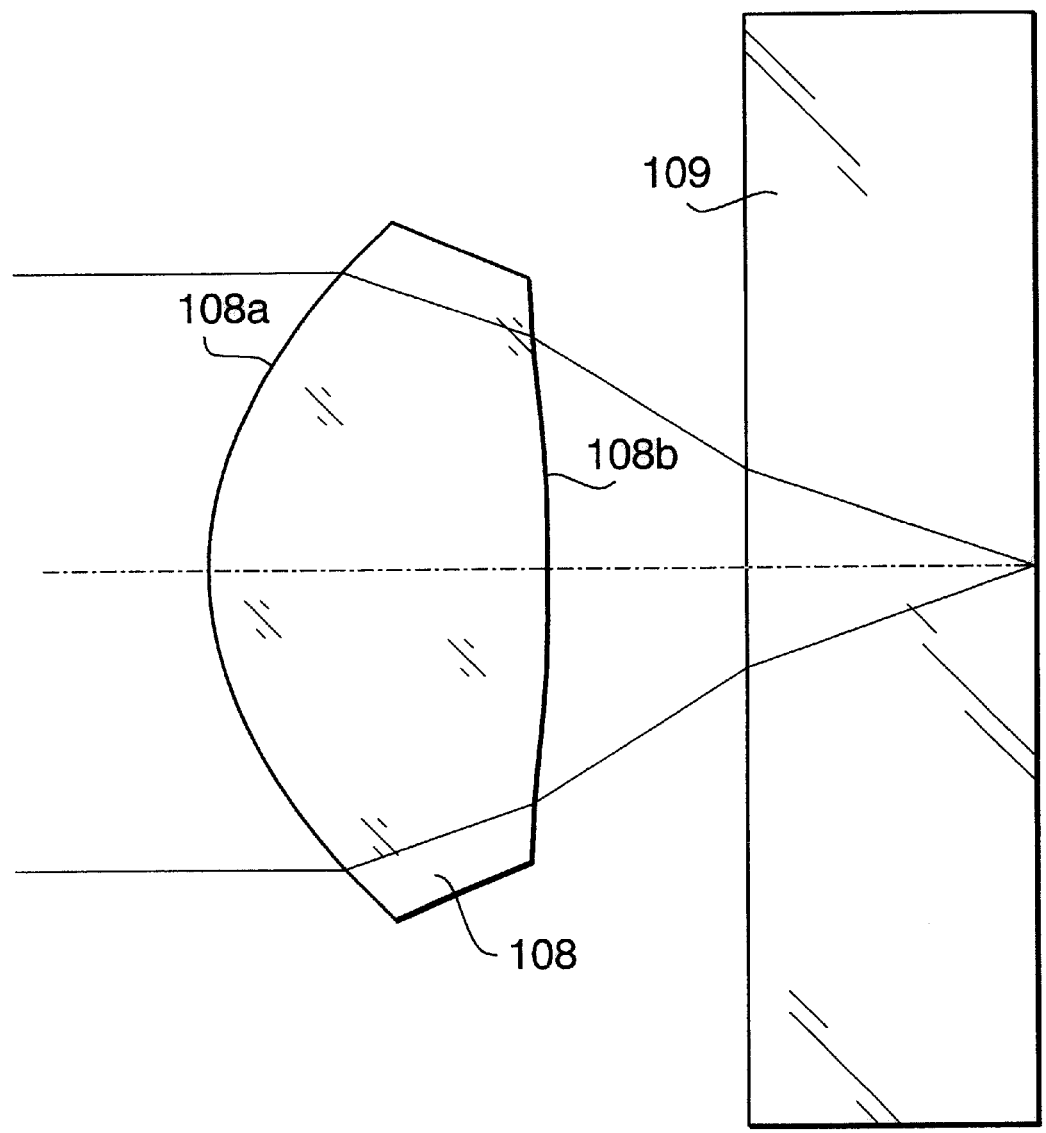
Figure 15:
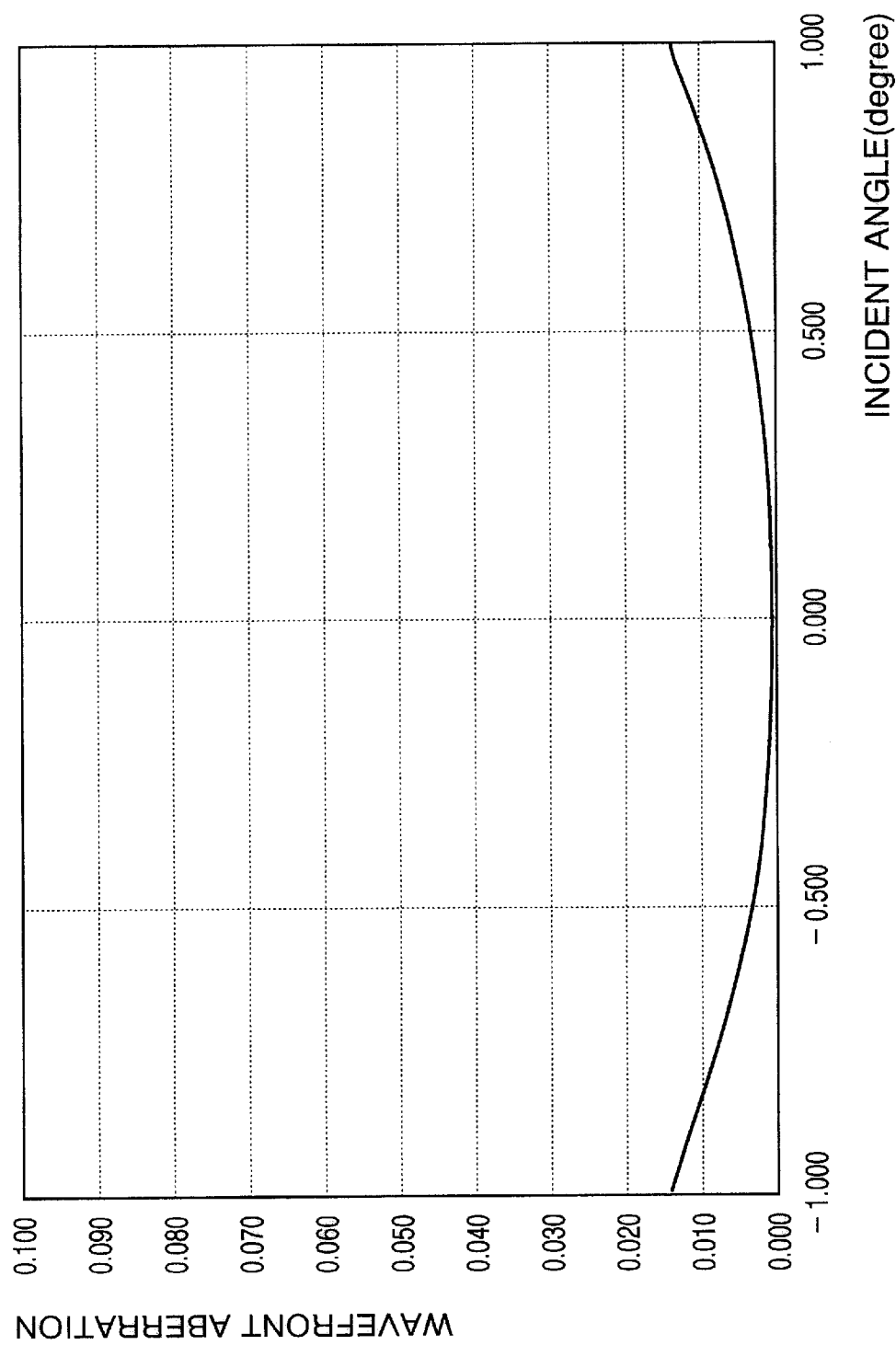

FIG. 5 schematically shows a front view of the polarizing diffractive grating of the composite optical element;

FIG. 6 schematically shows a configuration of an optical disc drive provided with an optical head according to an embodiment of the present invention;

FIGS. 7A–7C show the structure of the objective lens;

FIG. 8 schematically shows the objective lens and the DVD;

FIG. 9A shows spherical aberration SA and an offence SC against sine condition at the wavelength of 660 nm;

FIG. 9B shows chromatic aberration represented by spherical aberration for wavelengths of 660 nm, 655 nm and 665 nm;

FIG. 9C shows astigmatism (DS: sagittal; and DM: meridional);

FIGS. 10A–10H show wavefront aberration when the beam emitted by the first laser diode;

FIG. 11 is a graph showing a relationship between the incident angle of the beam emitted from the first laser diode with respect to the objective lens and wavefront aberration;

FIG. 12 schematically shows the objective lens and the second optical disc;

FIGS. 13A–13C show aberrations of the objective lens when the second wavelength for the second optical disc is 785 nm;

FIGS. 14A–14H show wavefront aberration when the beam is emitted by the second laser; and FIG. 15 is a graph showing a relationship between the incident angle of the beam emitted from the second laser diode with respect to the objective lens and wavefront aberration.

DETAILED DESCRIPTION OF THE EMBODIMENTS

Referring to the accompanying drawings, an optical disc drive, and optical heads and objective lenses according to embodiments of the invention will be described.

Firstly, three optical heads according to the embodiments will be described. Thereafter, concrete examples of an objective lens will be described.

First Embodiment

Figure 1:
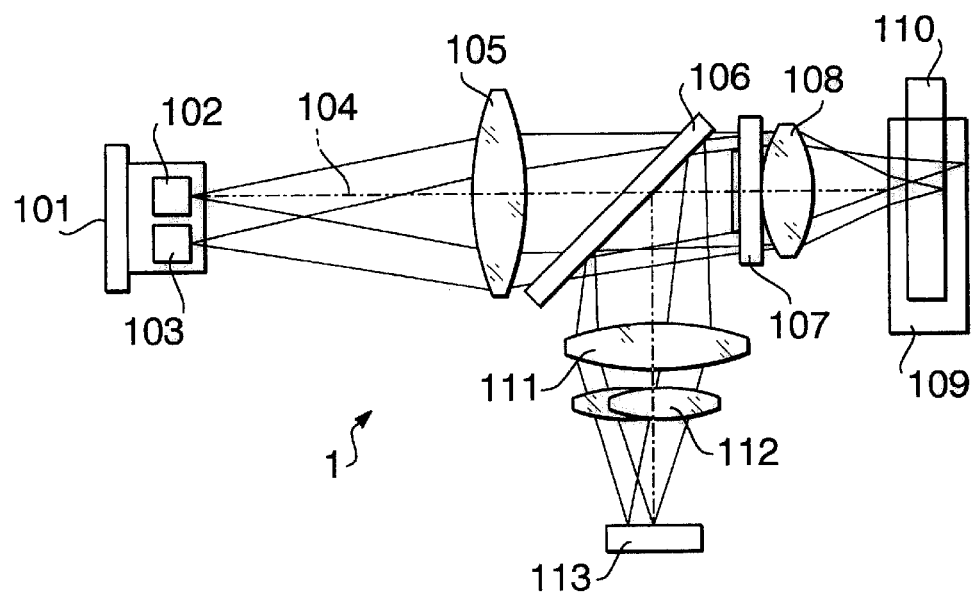
FIG. 1 is a schematic representation of an optical head according to a first embodiment of the invention.

FIG. 1 is a schematic representation of an optical head 1 according to a first embodiment of the invention. The optical head 1 Includes following components:

- a first laser diode 102, which emits a shorter wavelength (approximately 650 nm) laser beam, for a DVD;
- a second laser diode 103, which emits a longer wavelength (approximately 780 nm) laser beam, for a CD, where beam emitting points of the first and second laser diodes 102 and 103 are close to each other;
- an objective lens 108, which consists of a single lens element, for converging the laser beams emitted by the laser diodes 102 and 103 on the data recording surface of the optical discs (CD 109 and DVD 110) to form beams spots thereon, respectively;
- a photo detector 113 that receives light beam reflected by the optical disc (CD 109 or DVD 110); and
- a beam splitter 106, by which a part of light reflected by the optical disc is reflected to the photo detector 113.

The first and second laser diodes 102 and 103 are accommodated in a same package 101 such that the light emitting point of the first laser diode 102 is on the optical axis 104 of the objective lens 108. Diverging beams are emitted by the laser diodes 102 and 103, respectively, which are collimated by a collimating lens 105 provided between the package 101 and the beam splitter 106. The collimated beams pass through the beam splitter 106 and impinge on the objective lens 108. It should be noted that only one of the laser diodes 102 and 103 is driven to emit a beam at a time. The shorter wavelength laser beam emitted by the first laser diode 102 is incident on the objective lens 108 in parallel with the optical axis of the objective lens 108. The longer wavelength laser beam emitted by the second laser diode 103 is incident on the objective lens 108 with an angle with respect to the optical axis of the objective lens 108, since the light emitting point is not on the optical axis of the objective lens 108.

In FIG. 1, for the sake of description, both beams emitted by the first and second laser diode 102 and 103 are indicated, and both a first optical disc (i.e., a DVD) 110 and a second optical disc (i.e., CD) 109 are indicated in the same figure. When in use, only one disc 110 or 109 is mounted at a time, and one of the laser diodes 102 and 103 is driven. Specifically, when the first optical disc 110 (i.e., DVD), whose protective layer is 0.6 mm thick, is mounted, only the first laser diode 102 is driven, and when the second optical disc 109 (i.e., CD), whose protective layer is 1.2 mm thick, is mounted, only the second laser diode 103 is driven.

The objective lens 108 converges the laser beams emitted by the first and the second laser diodes 102 and 103 on the data recording surface of the first and second optical discs 110 and 109 through the protective layers thereof, respectively. The objective lens 108 is configured such that coma when the laser beam, whose wavelength is 780 nm, is converged on the data recording surface of the second disc 109 is compensated better than that when the laser beam whose wavelength is 640 nm is converged on the data recording surface of the first optical disc 110. Specifically, the objective lens 108 is configured such that its sine condition is satisfied, at the wavelength of 780 nm, for the second optical disc 109 whose protective layer is 1.2 mm thick. Since the sine condition is satisfied, aberration due to obliquely incident beam does not include components that are proportional to the incident angle. Therefore, even if the beam, whose wavelength is 780 nm, is incident on the objective lens 108 with an angle with respect to the optical axis of the objective lens 108, aberration can be suppressed in an allowable range, and the size of the beam spot formed on the data recording surface can be made sufficiently small.

With respect to the laser beam emitted by the first laser diode 102, the objective lens 108 does not satisfy the sine condition. However, since the beam incident on the objective lens 108 is perpendicular thereto, coma does not affect, and a sufficiently small beam spot can be formed on the data recording surface of the first optical disc 110.

Between the beam splitter 106 and the objective lens 108, a wavelength-selective aperture 107 is provided. The wavelength-selective aperture 107 is an optical element which allows the shorter wavelength (650 nm) laser beam for the DVD to pass through with the diameter of beam adjusted to correspond to NA (numerical aperture) of approximately 0.6, while the wavelength-selective aperture 107 allows the longer wavelength (780 nm) laser beam for the CD to pass through with the diameter of the beam adjusted to correspond to NA of approximately 0.45–0.50. Optionally, the wavelength-selective aperture 107 may be formed integrally with the objective lens 108. Alternatively, the objective lens 108 is configured such that a high NA area that is necessary only for the first optical disc 110 has relatively large aberrations for the longer wavelength (780 nm) laser beam. With this configuration, when the longer wavelength (780 nm) beam is incident, part of the beam incident on the high NA region is split, and therefore, the objective lens 108 has substantially the same function as the wavelength-selective aperture.

On the wavelength-selective aperture side surface of the objective lens 108, a diffractive lens structure formed with annular zones are formed. The diffractive lens structure provides spherical aberration which is undercorrected as the wavelength increases.

The spherical aberration of the optical system of the optical disc drive is changed in the overcorrected direction when the protective layer is thicker. As described above, for the first optical disc 110, which has a relatively thin protective layer, the shorter wavelength beam is used, and for the second optical disc 109, which has a relatively thick protective layer, the longer wavelength beam is used. Further, the spherical aberration of the objective lens 108 is well compensated for the first optical disc 110 (i.e., for the shorter wavelength beam), and the diffractive lens structure has a characteristic that the spherical aberration is undercorrected when the wavelength is longer. Accordingly, the spherical aberration, which is changed in the overcorrected direction when the mounted optical disc is changed from the first optical disc 110 to the second optical disc 109 can be cancelled by the undercorrected spherical aberration of the diffractive lens structure.

It should be noted that, for compensating the variation of the spherical aberration due to change of the wavelength of the beam, a phase shifter, which is disclosed in Japanese Patent Provisional Publication HEI 10-255305 may be utilized instead of the above-described structure.

The reflected beam, which has been converged on the data recording surface of the first or second optical disc 110 or 109 and modulated by the recorded data, passes through the objective lens 108 and the wavelength-selective aperture 107, is reflected by the beam splitter 106, and is incident on the photo detector 113 through a collective lens 111 and a cylindrical lens 112. The collective lens 111 converged the reflected beam, which is a parallel light beam, from the optical disc, and the cylindrical lens 112 provides astigmatism for detection of a focusing error. A tracking error can be detected with a 4-divided photo detector, which is achieved by the photo detector 113, utilizing a phase-difference detection method for the DVD-ROM, and a push-pull detection method for the CD or DVD-RAM.

Although not shown in FIG. 1, the optical head 1 is provided with an actuator for moving the objective lens 108 for locating a beam spot on a data track on the optical disc in accordance with a focusing error signal and a tracking error signal both detected by the outputs of the photo detector 113.

In the above-described first embodiment, the following points are stressed. Firstly, the two laser diodes are integrated as a module, and the first laser diode 102 for the first optical disc (i.e., DVD), which requires a relatively large NA, is located on the optical axis of the objective lens 108, and secondly, the objective lens 108 is designed such that occurrence of coma is suppressed when the second optical disc 109, which requires only a small NA. The other components of the above-described structure may be changed. For example, for detecting the focusing error, a double knife edge method, a spot size detection method may be used. Further, for detecting the tracking error, a three-beam method may be used. If the optical head 1 is required to have a relatively high efficiency, for example, when a DVD-RAM is mounted, the wavelength-selective aperture 107 may be replaced with an element, which is configured as integrally formed polarizing diffractive grating and a ¼ wavelength plate, and the beam splitter 106 may be replaced with a polarization prism.

Second Embodiment

Figure 2:
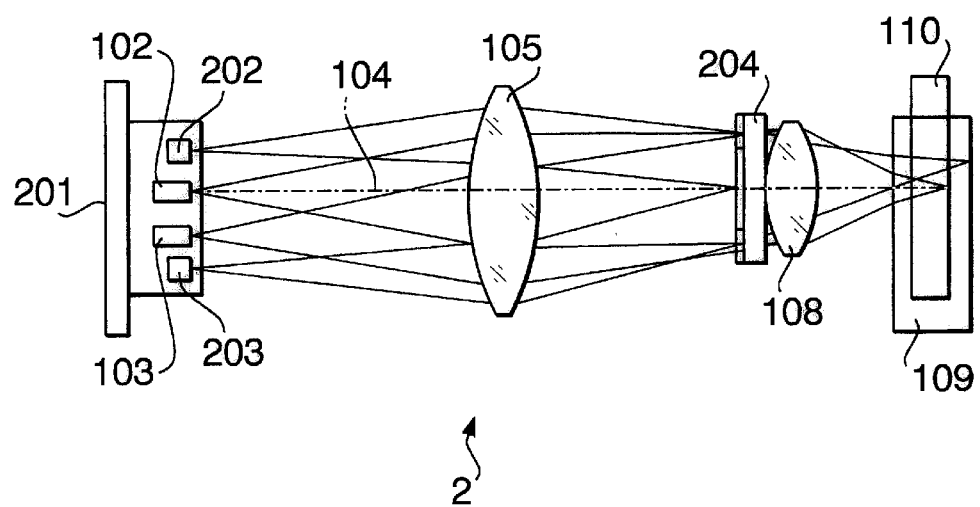
FIG. 2 shows a schematic representation of an optical head according to a second embodiment of the invention.

FIG. 2 shows a schematic representation of an optical head 2 according to a second embodiment of the invention. The same reference numerals are given to the elements similar to those of the optical head 1 according to the first embodiment.

The optical head 2 includes first and second laser diodes 102 and 103, and photo detectors 202 and 203. The two laser diodes 102 and 103, and the two photo detectors 202 and 203 are packaged as a 2LD/PD integrated module 201. The optical head 2 further includes a collimating lens 105, and the objective lens 108. Between the collimating lens 105 and the objective lens 108, a composite optical element 204 including integrally formed beam separating hologram and a wavelength-selective aperture.

Similarly to the optical head 1, the beam emitting point of the first laser diode for the first disc (i.e., DVD) 110 is on the optical axis of the objective lens 108. The beam emitted by the second laser diode 103 is incident on the objective lens 108 with an angle with respect to the optical axis 104 of the objective lens 108. The objective lens 108 is configured such that coma is compensated for the second optical disc 109, i.e., the sine condition is satisfied, and therefore, even though the beam is obliquely incident on the objective lens 108, the beam spot formed on the data recording surface of the second disc 109 is not substantially deteriorated.

The laser beams emitted by the first and second laser diodes 102 and 103 are collimated by the collimating lens 105, and are incident on the composite optical element 204. It should be noted that the composite optical element 204 is required to function (i.e., beam separating function) only for the beam reflected by the optical disc. Accordingly, by employing a polarizing hologram as the hologram so that it does not function for the beam directed to the optical disc, reduction of efficiency and generation of stray light can be avoided.

The laser beam passed through the composite optical element 204 is converged on the data recording surface of the first optical disc 110 or the second optical disc 109. The reflected beam passes through the objective lens 108, separated by the composite optical element 204, and then, the separated beams are received by the photo detectors 202 and 203 of the 2LD/PD integrated module 201.

The composite optical element 204 has a circular area through which a light beam passes. The circular area is divided by lines extending in a direction of a radius and in a direction of a tangential line of the optical disc into four equivalent areas. The divided areas are formed with separation holograms, whose grating vector directions are different from each other. With this configuration, a beam is divided into ¼ part each and individually detected. An example of such a method is described in Japanese Patent Provisional Publication HEI 11-53759. Thus, for the detection of the focusing error, a double knife edge method can be used, and for the detection of the tracking error, a phase difference method or a push-pull method can be employed, and therefore a DVD-ROM, a DVD-RAM, and CD can be used.

It should be noted that only two photo detectors are indicated in FIG. 2 for the sake of simplicity. However, in order to detect a beam by dividing the same into four parts, eight detection areas for one wavelength are generally necessary, and sixteen detection areas for two wavelengths. The number of areas, however, can be reduced as will be described with reference to a third embodiment, by arranging the optical elements appropriately.

Third Embodiment

Figure 3:
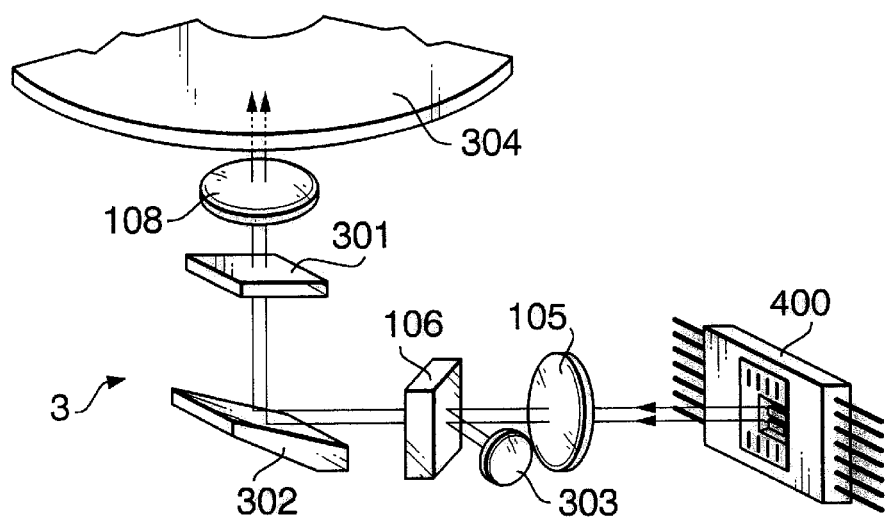
FIG. 3 shows a schematic representation of an optical head according to a third embodiment of the invention.

FIG. 3 shows a schematic representation of an optical head 3 according to the third embodiment of the invention. The optical head 3 is provided with a 2LD/PD integrated module 400 which includes a first laser diode for a DVD and a second laser diode for a CD, and photo detectors. The same reference numerals are assigned to elements which are similar to those employed in the optical heads 1 and 2.

The laser beams emitted by the laser diodes included in the 2LD/PD integrated module 400 are collimated by a collimating lens 105, pass through a beam splitter 106, reflected by a beam shaping mirror 302, pass through a composite optical element 301 including integrated polarizing hologram and ¼ wavelength plate. The beams passed through the composite optical element 301 are converged by an objective lens 108 on the data recording surface of optical disc 304 (DVD or CD).

The beam splitter 106 reflects part of light beams emitted by the laser diodes, which is directed to a photo detector 303 for monitoring the output power of the laser diodes. The output of the monitoring photo detector 303 is utilized, for example, to monitor a recording pulse waveform when data is written on a DVD-RAM or the like. The beam shaping mirror 302 is a wedge prism. The beams incident on the beam shaping mirror 302 are refracted on its surface (which will be referred to as a front surface) and reflected by an opposite surface (which will be referred to as a rear surface) that is inclined with respect to the front surface. The reflected beams are refracted again by the front surface and exit therefrom. During the above-described refraction and reflection, the cross-sectional shape of the beams are changed. Specifically, the cross-sectional shape of a beam emitted by a laser diode is elliptic, and by the beam shaping mirror 302, the cross-sectional shape is elongated in one direction (in the shorter axis direction) so that the cross-sectional shape is substantially circular. With this beam shaping, the quality of beam spots formed on the data recording surface of the optical disc can be improved, and utilization efficiency of light beams can be raised.

The laser beams reflected by the data recording surface of the optical discs 304 pass through the objective lens 108, are diffracted by the polarizing diffractive grating included in the composite optical element 301. Then, the beams are converged, by the collimating lens 105, on the photo detectors included in the 2LD/PD integrated module 400 via the beam shaping mirror 302 and the beam splitter 106.

Figure 4A:
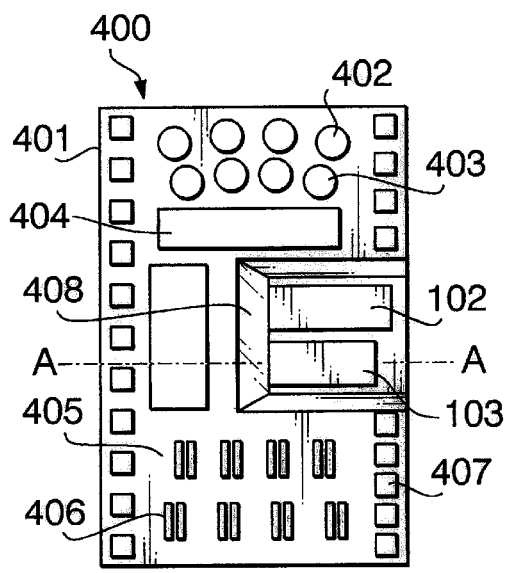
FIG. 4A shows a front view of a 2LD/PD integrated module.
Figure 4B:
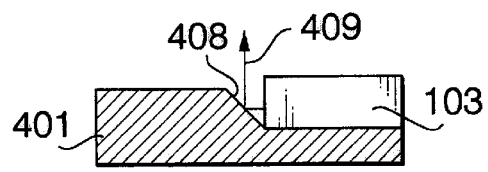
FIG. 4B shows a cross sectional view of the 2LD/PD integrated module taken along line A—A in FIG. 4A.

FIG. 4A shows a front view of the 2LD/PD integrated module 400, and FIG. 4B shows a cross sectional view thereof taken along line A—A in FIG. 4A. The first laser diode 102 for the DVD and the second laser diode 103 for the CD are situated on a concave portion which is formed on the Silicon base plate 401 by etching. A side wall of the concave portion, facing the laser diodes 102 and 103 is inclined at 45° with respect to the bottom surface of the concave portion on which the laser diodes 102 and 103 are situated. The inclined surface is finished to function as a reflector 408. Therefore, the laser beams 409 emitted by the laser diodes 102 and 103 are deflected by the mirror surface 408 at 90 degrees, in the direction perpendicular to the bottom surface of the concave portion (see FIG. 4B).

Around the concave portion, the photo detectors 402, 403, 405 and 406, and an amplifier IC 404 are arranged. The photo detectors 402 are detectors for detecting reproduction signal and tracking error signals for the DVD, and the photo detectors 403 are detectors for detecting reproduction signal and tracking error signals for the CD. The detectors 405 and 406 are detectors for detecting focusing error signals for the DVD and CD, respectively. As shown in FIG. 4A, there are four sets of detectors 402, 403, 405 and 406. The four detectors of each sets receive divided portions of the light beam reflected by the optical disc 304, which is divided by lines extending in the radial direction and the tangential line direction of the optical disc 304. Since the diffraction angles of the hologram 301 for the beams for the DVD and the beams for the CD are different, respectively, each set includes four detectors.

Each of the detectors 405 and 406 has a pair of rectangular light receiving areas aligned in a direction of the shorter side of the rectangle, since the focusing error is detected in accordance with the double knife edge method. When the beam spots are focused on the data recording surface of the optical disc, the four divided light beams are focused on the pairs of rectangular areas, respectively. If the focal plane of the beam spots is away from the data recording surface, the size of the beam spots on the detectors increases. Further, if the focal plane is located in front of the data recording surface, the beam spots on each pair of detecting areas shift in one detecting area side, while if the focal plane is located on a rear side of the data recording surface, the beam spots on each pair of detecting areas shift in the other detecting area side. By calculating a difference between (a) a sum of outputs of detecting areas which receive greater amount of light when the focal plane is in front of the data recording surface, and (b) a sum of outputs of detecting areas which receive greater amount of light when the focal plane is located on the rear side of the data recording surface, the focusing error signal is obtained. Since the focusing error signal is obtained based on outputs of a plurality of pairs of detecting areas, affects of the positional errors of beam spots can be cancelled. Therefore, a relatively high accuracy of the focusing error signal can be maintained without precise adjustment of the positions of the detectors.

FIG. 5 schematically shows a front view of the polarizing diffractive grating of the composite optical element 301. As shown in FIG. 5, the polarizing diffractive grating is configured such that the beam reflected by the data recording surface of the optical disc is divided into four portions with the lines extending in the radial and tangential directions of the optical disc, and the divided beams are diffracted in different directions.

FIG. 6 schematically shows a configuration of an optical disc drive 601 implemented with an optical head according to an embodiment of the present invention.

The optical disc drive 601 includes an optical head 602, a mechanical system including motor and the like, and a control system for controlling the operation of the optical disc drive 601. In particular, in the optical device 601, the optical head 602 is substantially similar to the optical head 3 according to the above-described third embodiment, although schematically shown in FIG. 6. The optical head 602, therefore, has the 2LD/PD integrated module 400, the composite optical element 301 and the objective lens 108.

The mechanical system includes a lens actuator 609 that performs fine movement of the objective lens 108 in a direction of the optical axis thereof as well as in a radial direction of the optical disc 304, a course actuator 610 which moves the optical head 601 in the radial direction of the optical disc 304, and a spindle motor 612 that rotates the optical disc 304.

The control system includes a controller 606 which controls the operation of the entire system of the optical disc drive 601, and further includes an I/O (Input/Output) circuit 604, a buffer memory 607, a recording waveform generating circuit 608, a signal processing/reproducing circuit 611, and a spindle motor driving circuit 613.

The I/O circuit 604 is connected to the 2LD/PD integrated module 400 by cable 603, and receives/transmits signals from/to the 2LD/PD integrated module 400. The I/O circuit 604 includes a laser driver circuit for driving the laser diodes 102 and 103 of the optical head 601, and an I-V (current-to-voltage) converter for receiving the electrical current signals from the detectors and converting the same to voltage signals.

Specifically, the I-V converter converts the electrical current output from the detectors into voltage to generate an RF signal, focusing error signal and the tracking error signal. The RF signal is transmitted to a signal processing/reproducing circuit 611, where equalizing, binalizing and decoding processes are performed to reproduce digital output data. The digital output data is stored in a buffer memory 607. The focusing/tracking error signals are transmitted back to a lens actuator 609 so that the lens actuator 609 is closed-loop controlled to be always located on a data track of the data recording surface of the optical disc 304.

Further, the I-V converter generates a head position control signal based on a address information pit of the optical disc 304 using the RF signal. The head position control signal is input to the course actuator 610, which controls the optical head 602 such that it is roughly located in the vicinity of a track being read. This movement is generally open-loop controlled in the CD, DVD and MD drives, although a closed-loop control is generally preferred for magneto-optical discs for digital data recording.

When data is recorded on the DVD or the like, the controller 606 stores user data 605 in the buffer memory 607. Then, based on the stored digital data, the recording waveform generating circuit 608 generates a recording signal. The laser driver circuit is driven in accordance with the recording signal to modulate the laser beam.

The spindle motor 612 for rotating the optical disc 304 is controlled by a spindle motor driving circuit 613, which is controlled by the controller 606.

Next, the structure of the objective lens 108 will be described in detail.

FIGS. 7A–7C show the structure of the objective lens 108. FIG. 7A is a front view, FIG. 7B is a cross-section taken along the central line in FIG. 7A, and FIG. 7C is a partially enlarged view of the surface of the objective lens 108. The objective lens 108 is a single lens element having two convex aspherical surface 108a and 108b made of synthetic resin. On the surface 108a, annular zones, which are concentric with respect to the optical axis of the objective lens 108, are formed as shown in FIG. 7C to provide a diffractive lens structure. As schematically shown in FIG. 7C, at borders between the annular zones, steps extending in parallel with the optical axis are formed as in the Fresnel lens structure.

The surface of the objective lens 108 can be divided into a common region Rc and a high NA region Rh. The common region Rc provides a relatively low NA which is necessary and sufficient for forming a valid beam spot on the optical disc having a relatively low recording density, i.e., the CD, CD-R, and the like. The high NA region Rh provides together with the common region Rc, a relatively high NA which is necessary for forming a valid beam spot on the optical disc having a relatively high recording density, i.e., DVD. The diffractive lens structure is formed on the whole area of the first surface 108a, including the common region Rc and the high NA region Rh.

The objective lens 108 is formed to satisfy the following condition (1).

$$0 < |SC_2/SC_1| < 0.2 \qquad (1)$$

where, $SC_1$ represents an offence SC against the sine condition at the peripheral portion of the common region Rc when the shorter wavelength (e.g., 785 nm) laser beam is converged on the first optical disc (e.g., CD), $SC_2$ represents an offence SC against the sine condition at the peripheral portion of the common region Rc when the longer wavelength (e.g., 660 nm) laser beam is converged on the second optical disc (e.g., DVD), and the offence SC against the sine condition is defined by the formula below.

$$SC = nH_1/(n' \sin U') - f(1-m)$$

where, n represents a refractive index on the beam incident side medium (i.e., the air in the embodiment), n' represents a refractive index on the beam emerging side medium (i.e., the protective layer in the embodiment), U' represents an angle of the emerging beam with respect to the optical axis, m represents a paraxial magnification, $H_1$ represents a ray height on a principal plane, and f represents a focal length.

Hereinafter, a concrete embodiment in accordance with the above-described embodiments will be described.

FIG. 8 schematically shows the objective lens 108 and the DVD 110. The diffractive lens structure is formed on the surface 108a, and the first order diffractive component is converged on the data recording surface of the DVD 110. The surface 108b is an aspherical surface without steps.

The numerical structure of the objective lens 108 is indicated in Tables 1–3. Table 1 indicates an overall specification of the objective lens 108. Tables 2 and 3 indicate the data of the first and second surfaces 108a and 108b, respectively. The common region Rc is a region for 0≦h<1.25 (unit: mm), and the high NA region Rh is a region for 1.25≦h<1.40 (unit: mm). In Tables, $\lambda_1$, $NA_1$, $f_1$ represent the wavelength, NA, focal length when the first disc (e.g., DVD) is used, and $\lambda_2$, $NA_2$, $f_2$ represent the wavelength, NA, focal length when the second disc (e.g., CD) is used. Further, nλ represents the refractive index for the wavelength λ.

TABLE 1

| | | |
|---|---|---|
| λ1 = 660 nm | NA1: 0.60 | f1 = 2.340 mm |
| λ2 = 785 nm | NA2: 0.53 | f2 = 2.356 mm |
| distance between 1st and 2nd surfaces | 1.460 mm | |
| refractive index | n660 = 1.54044 | |
| | n785 = 1.53665 | |
| Abbe number υ: | 55.6 | |
| thickness of protective layer DVD: | 0.600 mm | |
| CD: | 1.200 mm | |

The base curves (i.e., the shape of a refractive lens excluding the diffractive lens structure) and the diffractive lens structures in common region Rc and in the high NA region Rh of the first surface 108a have different shapes and functions.

The aspherical surface defining the base curve is expressed by the following equation.

$$X(h) = \frac{Ch^2}{1 + \sqrt{1 - (1+K)C^2h^2}} + A_4h^4 + A_6h^6 + A_8h^8 + A_{10}h^{10} + A_{12}h^{12}$$

where, h represents a height of a point on the aspherical surface with respect to the optical axis, X(h) represents a SAG (i.e., a distance of the point from a plane tangential to the aspherical surface at the optical axis), C represents a curvature (i.e., 1/r, r being a radius of curvature), K represents a conical coefficient, and $A_4$, $A_6$, $A_8$, $A_{10}$, $A_{12}$ represent 4th, 6th, 8th 10th, 12th order aspherical coefficients, respectively.

Further, an additional optical path length, which is added by the diffractive lens structure, is represented by a optical path difference function φ(h) below.

$$\phi(h) = (P_2h^2 + P_4h^4 + P_6h^6 + \ldots) \times m \times \lambda$$

where, h represents a height from the optical axis, $P_n$ represents an n-th (n being even) optical path length difference coefficient, m represent the order of diffraction, and λ represents a wavelength.

The optical path length difference function φ(h) represents an optical path difference between an optical path length of a diffracted ray, at the ray height of h, and an optical path length of a ray when the ray would not be diffracted by the diffractive lens structure.

In Table 2, the aspherical coefficient, the optical path difference function coefficients for the first surface 108a are indicated. λB represents a blazed wavelength of the diffractive lens structure.

TABLE 2

First surface 108a

|  | common region ($0 \leq h < 1.25$) | high NA region ($1.25 \leq h < 1.40$) |
|---|---|---|
| r | 1.508 | 1.533 |
| κ | −0.520 | −0.520 |
| $A_4$ | $-8.3030 \times 10^{-3}$ | $-4.3030 \times 10^{-3}$ |
| $A_6$ | $-9.7730 \times 10^{-4}$ | $-1.3950 \times 10^{-3}$ |
| $A_8$ | $3.5940 \times 10^{-4}$ | $1.7170 \times 10^{-3}$ |
| $A_{10}$ | $-6.6980 \times 10^{-4}$ | $-1.2360 \times 10^{-3}$ |
| $A_{12}$ | $1.3430 \times 10^{-4}$ | $2.5410 \times 10^{-4}$ |
| $P_2$ | 0.0000 | −4.42763 |
| $P_4$ | −7.5770 | −4.87000 |
| $P_6$ | −0.7383 | −0.60200 |
| $P_8$ | −0.1365 | 0 |
| $P_{10}$ | 0 | 0 |
| λB | 659 nm | 660 nm |

TABLE 3

Second surface 108b

|  | entire region |
|---|---|
| r | −5.288 |
| κ | 0.0000 |
| $A_4$ | $4.2630 \times 10^{-2}$ |
| $A_6$ | $-9.6340 \times 10^{-3}$ |
| $A_8$ | $-3.4840 \times 10^{-3}$ |
| $A_{10}$ | $3.4490 \times 10^{-3}$ |
| $A_{12}$ | $-7.1060 \times 10^{-4}$ |

FIGS. 9A–9C show aberrations of an optical system consisting of the optical disc and the protective layer when the first wavelength λ1 for the first optical disc (e.g., DVD) 110 is 660 nm. FIG. 9A shows spherical aberration SA and offence SC against the sine condition at the wavelength of 660 nm; FIG. 9B shows chromatic aberration represented by spherical aberration for wavelengths of 660 nm, 655 nm and 665 nm; and FIG. 9C shows astigmatism (DS: sagittal; and DM: meridional). In each graph, horizontal axis represents amount of aberration (unit: mm).

Figure 10A:
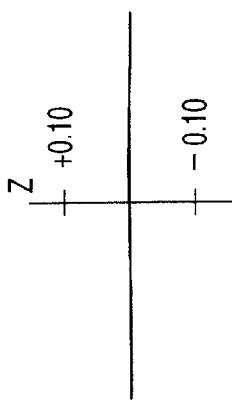
Figure 10B:
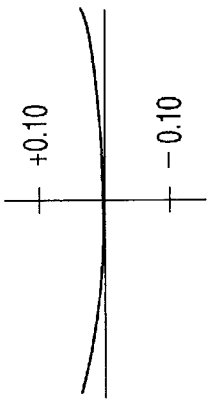
Figure 10C:
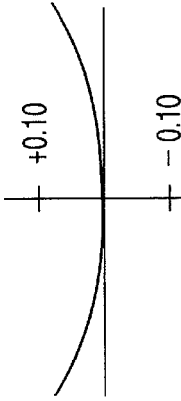
Figure 10D:
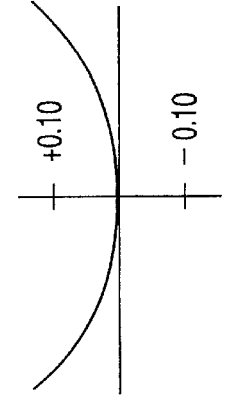
Figure 10E:
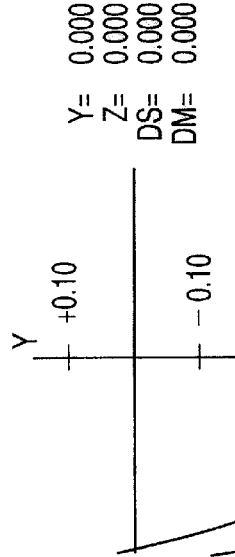
Figure 10F:
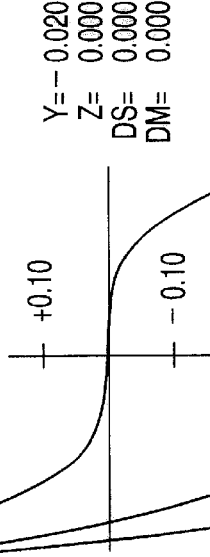
Figure 10G:
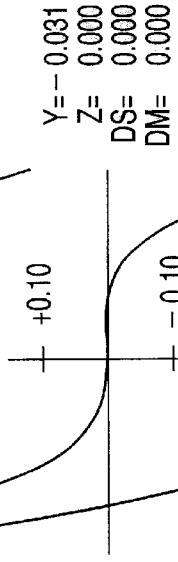
Figure 10H:
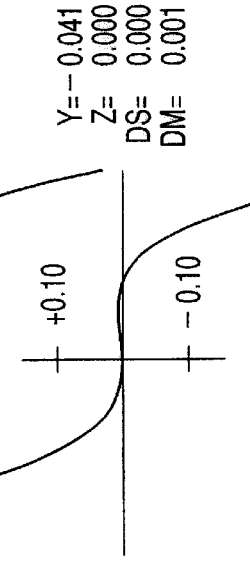

FIGS. 10A–10H show wavefront aberration of the optical system consisting of the objective lens and the protective layer of the optical disc when the beam emitted by the first laser diode 102 (FIGS. 10A–10D: meridional direction; and FIGS. 10E–10H: sagittal direction). In each graph, the horizontal axis represent an entrance pupil, and the vertical axis represents the amount of wavefront aberration. Further, FIGS. 10A and 10E are graphs when the incident angle is 0°, FIGS. 10B and 10F are graphs when the incident angle is 0.5°, FIGS. 10C and 10G are graphs when the incident angle is 0.75° and FIGS. 10D and 10H are graphs when the incident angle is 1.0°.

FIG. 11 is a graph showing a relationship between the incident angle of the beam emitted from the first laser diode 102 with respect to the objective lens 108 and wavefront aberration (rms: root-mean-square value) of the optical system consisting of the objective lens 108 and the protective layer of the optical disc. Since the coma is not compensated for the first beam (i.e., for DVD), only at a small incident angle, the wavefront aberration increases significantly.

FIG. 12 schematically shows the objective lens 108 and the second optical disc (i.e., CD) 109. In this case, the second laser diode 103 emits a laser beam, whose wavelength is 735 nm, which is converged on the data recording surface of the optical disc 109 by the objective lens 108.

FIGS. 13A–13C show aberrations of the optical system consisting of the objective lens 108 and the protective layer of the optical disc when the second wavelength λ2 for the second optical disc (e.g., CD) 109 is 785 nm. FIG. 13A shows spherical aberration SA and an offence SC against sine condition at the wavelength of 785 mm FIG. 13B shows chromatic aberration represented by spherical aberration for wavelengths of 785 nm, 780 nm and 790 nm; and FIG. 13C shows astigmatism (DS: sagittal; and DM: meridional).

FIGS. 14A–14H show wavefront aberration of the optical system consisting or the objective lens 108 and the protective layer of the optical disc when the beam emitted by the second laser diode 103 (FIGS. 14A–14D: meridional direction; and FIGS. 14E–14H: sagittal direction). FIGS. 14A and 14E are graphs when the incident angle is 0°, FIGS. 14B and 14F are graphs when the incident angle is 0.50°, FIGS. 14C and 14G are graphs when the incident angle is 0.75° and FIGS. 14D and 14H are graphs when the incident angle is 1.0°.

FIG. 15 is a graph showing a relationship between the incident angle of the beam emitted from the second laser diode 103 with respect to the objective lens 108 and wavefront aberration (rms: root-mean-square value) of the optical system consisting of the objective lens and the protective layer of the optical disc. Since the coma is not compensated for the second beam (i.e., for CD), even at a large incident angle, the coma is not exhibited, and astigmatism is well suppressed. Accordingly, the wavefront aberration can be well suppressed as shown in FIG. 15. Therefore, the size of the beam spot formed on the data recording surface of the optical disc can be made sufficiently small to the desired size.

In the above embodiment, the offence $SC_1$ against the sine condition at the peripheral portion of the common region RC when the shorter wavelength (660 nm) laser beam is converged on the data recording surface of the DVD is 0.0348 mm, the offence $SC_2$ against the sine condition at the peripheral portion of the common region RC when the longer wavelength (785 nm) laser beam is converged on the data recording surface of the CD is −0.0012 mm. Therefore, $|SC_2/SC_1|=|-0.0012/0.0348|=0.034$, which satisfies the condition (1).

As described above with referring to the embodiments, according to the present invention, an appropriate beam spot can be formed on the data recording surface of the optical disc.

The present disclosure relates to the subject matter contained in Japanese Patent Application No. 2000-054907, filed on Feb. 29, 2000, which is expressly incorporated herein by reference in its entirety.

What is claimed is:

1. An objective lens that converges a first laser beam having a first wavelength on a first optical disc having a first protective layer, and a second laser beam having a second wavelength on a second optical disc having a second protective layer, said first wavelength being shorter than said second wavelength, a data recording density of said first optical disc being greater than a data recording density of said second optical disc, a thickness of said first protective layer being smaller than a thickness of said second protective layer, a first region being defined on said objective lens, said first region providing a numerical aperture appropriate for converging said second laser beam on said second optical disc, coma of said objective lens in said first region being compensated better when said second laser beam is converged on said second optical disc than when said first laser beam is converged on said first optical discs, the objective lens satisfying the following condition:

$$0<|SC_2/SC_1|<0.2,$$

wherein, $SC_1$ represents an offense, SC against sine condition at the peripheral portion of said first region, taking the protective layer of said first optical disc into account, when the said first laser beam is converged on said first optical disc, wherein $SC_2$ represents an offense, SC against sine condition at the peripheral portion of said first region, taking the protective layer of said second optical disc into account, when said second laser beam is converged on the second optical disc, and wherein the offense SC against the sine condition is defined by the following formula:

$$SC=nH_1/(n' \sin U')-f(1-m)$$

wherein, n represents a refractive index on the beam incident side medium, n' represents a refractive index on the beam emerging side medium, U' represents an angle of the emerging beam with respect to the optical axis, m represents a paraxial magnification, $H_1$ represents a ray height on a principal plane, and f represents a focal length.

2. The objective lens according to claim 1, satisfying a sine condition when said second laser beam is converged on said second optical disc.

3. The objective lens according to claim 1, consisting of a single lens element, one of the refraction surfaces of the objective lens being formed with a diffractive lens structure exhibiting spherical aberration which is changed in an undercorrected direction as the wavelength increases.

4. The objective lens according to claim 1, wherein said diffractive lens structure includes a plurality of concentric annular zones.

5. The objective lens according to claim 1, wherein said first wavelength is approximately 660 nm, and wherein said second wavelength is approximately 785 nm.

6. The objective lens according to claim 1, wherein at least the first region of the objective lens has a diffractive lens structure.

7. An optical head for an optical disc drive, comprising:

a first laser diode that emits a first laser beam having a first wavelength;

a second laser diode that emits a second laser beam having a second wavelength which is longer than said first wavelength, beam emitting points of said first laser diode and said second laser diode being close to each other;

an objective lens, said objective lens converging said first laser beam on a first optical disc having a first protective layer to form a beam spot, said objective lens converging said second laser beam on a second optical disc having a second protective layer to form the beam spot, a data recording density of said first optical disc being greater than a data recording density of said second optical disc, a thickness of said first protective layer being smaller than a thickness of said second protective layer, a first region being defined on said objective lens, said first region providing a numerical aperture appropriate for converging said second laser beam on said second optical disc, coma of said objective lens being compensated better when said second laser beam is converged on said second optical disc than when said first laser beam is converged on said first optical discs, the objective lens satisfying the following condition:

$$0<|SC_2/SC_1|<0.2,$$

wherein, $SC_1$ represents an offense SC against sine condition at the peripheral portion of said first region, taking the protective layer of said first optical disc into account, when the said first laser beam is converged on said first optical disc, wherein $SC_2$ represents an offense SC against sine condition at the peripheral portion of said first region, taking the protective layer of said second optical disc into account, when said second laser beam is converged on the second optical disc, and wherein the offense SC against the sine condition is defined by the following formula:

$$SC=nH_1/(n' \sin U')-f(1-m)$$

wherein, n represents a refractive index on the beam incident side medium, n' a refractive index on the beam emerging side medium, U' represents an angle of the emerging beam with respect to the optical axis, m represents a paraxial magnification, $H_1$ represents a ray height on a principal plane, and f represents a focal length, an actuator that drives said objective lens so that said beam spot traces a data track on said optical disc;

a photo detecting system that receives the beam reflected by said optical disc; and a beam splitter that directs the beam reflected by said optical disc to said photo detecting system.

8. The optical head according to claim 7, wherein said first laser diode and said second laser diode are in a single module.

9. The optical head according to claim 7, wherein said first laser diode, said second laser diode and said photo detecting system are in a single module.

10. The optical head according to claim 7, wherein a beam emitting point of said first laser diode is located closer to the optical axis of said objective lens than a beam emitting point of said second laser diode.

11. The optical head according to claim 10, wherein the beam emitting point of said first laser diode is located on the optical axis of said objective lens.

12. The optical head for an optical disc drive according to claim 7, wherein at least the first region of said objective lens has a diffractive lens structure.

13. An optical disc drive, comprising:

an optical head, said optical head including:

a first laser diode that emits a first laser beam having a first wavelength;

a second laser diode that emits a second laser beam having a second wavelength which is longer than said first wavelength, beam emitting points of said first laser diode and said second laser diode being close to each other;

an objective lens, said objective lens converging said first laser beam on a first optical disc having a first protective layer to form a beam spot, said objective lens converging said second laser beam on a second optical disc having a second protective layer to form the beam spot, a data recording density of said first optical disc being greater than a data recording density of said second optical disc, a thickness of said first protective layer being smaller than a thickness of said second protective layer, a first region being defined on said objective lens, said first region providing a numerical aperture appropriate for converging said second laser beam on said second optical disc, coma of said objective lens being compensated better when said second laser beam is converged on said second optical disc than when said first laser beam is converged on said first optical disc;

an actuator that drives said objective lens so that said beam spot traces a data track on said optical disc;

a photo detecting system that receives the beam reflected by said optical disc;

a beam splitter that splits the beam reflected by said optical disc so as to direct a split beam to said photo detecting system;

a laser driver that drives said first and second laser diodes to emit said first and second laser beams;

a current-to-voltage converter that converts electrical current output by said photo detecting system to a voltage signal;

an operation circuit that obtains a position control signal for the beam spot in accordance with said voltage signal;

a controller the drives said actuator in accordance with said position control signal;

a motor that rotates said optical disc;

a coarse actuator that moves said optical head in a radial direction of said optical disc; and a signal processing circuit that reproduces data recorded on said optical disc in accordance with said voltage signal discs, the objective lens satisfying the following condition:

$$0<|SC_2/SC_1|<0.2,$$

wherein, $SC_1$ represents an offense SC against sine condition at the peripheral portion of said first region, taking the protective layer of said first optical disc into account, when the said first laser beam is converged on said first optical disc, wherein $SC_2$ represents an offense SC against sine condition at the peripheral portion of said first region, taking the protective layer of said second optical disc into account, when said second laser beam is converged on the second optical disc, and wherein the offense SC against the sine condition is defined by the following formula:

$$SC=nH_1/(n' \sin U')-f(1-m)$$

wherein, n represents a refractive index on the beam incident side medium, n' represents a refractive index on the beam emerging side medium, U' represents an angle of the emerging beam with respect to the optical axis, m represents a paraxial magnification, $H_1$ represents a ray height on a principal plane, and f represents a focal length.

14. The optical disc drive according to claim 13, wherein at least the first region of said objective lens has a diffractive lens structure.

* * * * *